United States Patent Office 3,157,553
Patented Nov. 17, 1964

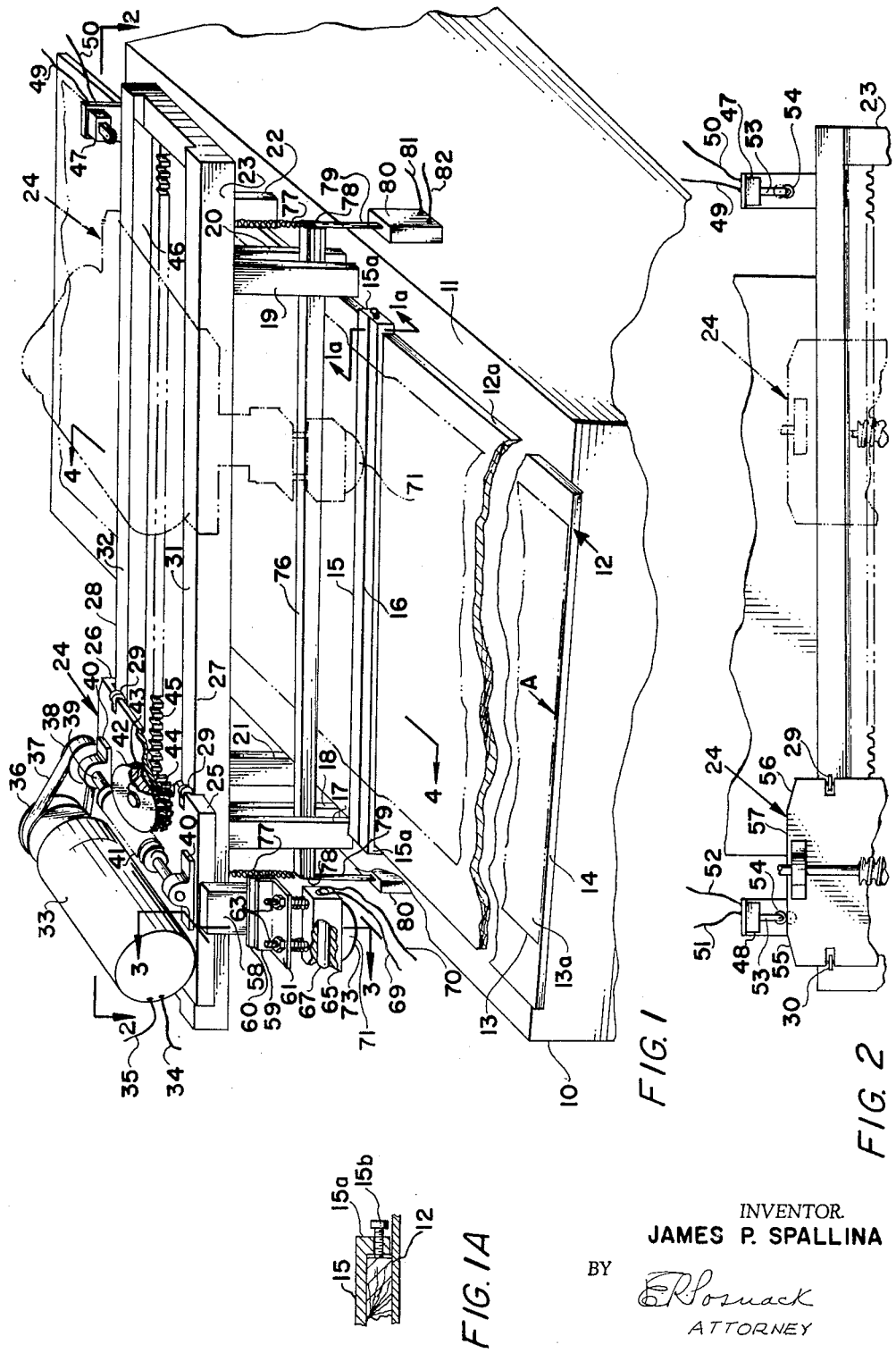

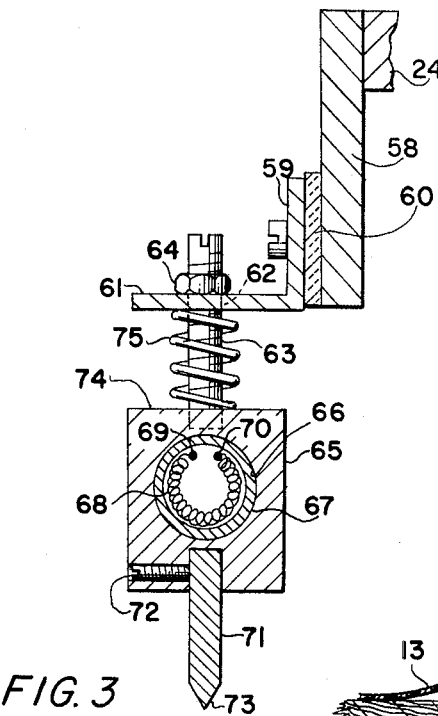
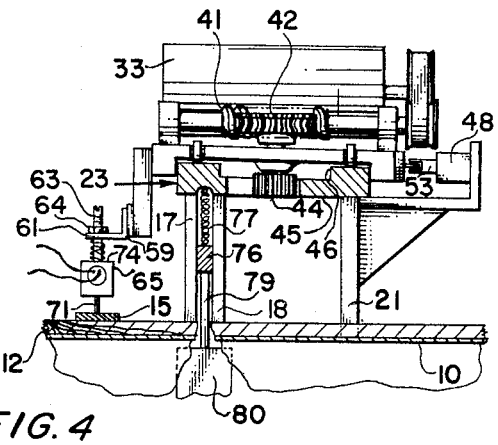
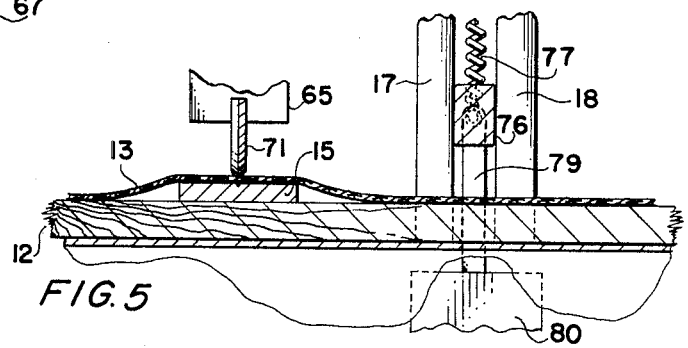
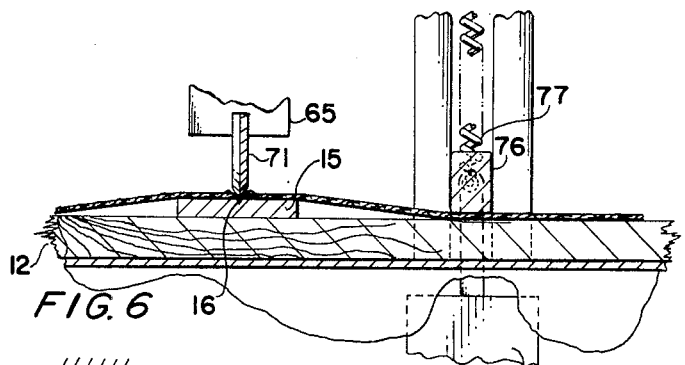
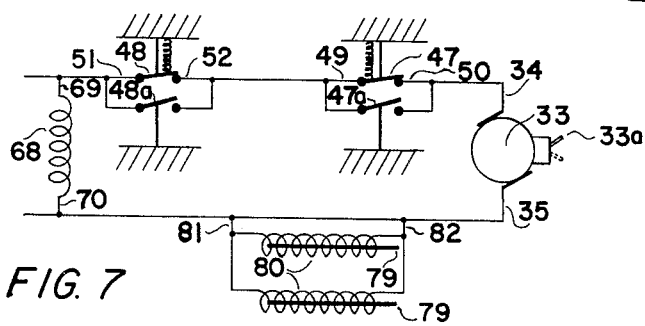

3,157,553
APPARATUS FOR CUTTING LENGTHS OF HEAT-FUSIBLE FABRIC AND SEALING THE CUT EDGES THEREOF
James P. Spallina, Clifton, N.J., assignor to Bartmann & Bixer, Inc., New York, N.Y., a corporation of New York
Filed Oct. 31, 1962, Ser. No. 234,480
9 Claims. (Cl. 156—515)

This invention relates to an apparatus for measuring, cutting and sealing against fraying a web of fabric, and is particularly directed to the operation of cutting off predetermined lengths of an intermittently movable sheet of fabric, such as curtain material made of thermoplastic or heat fusible fibers, and sealing the cut edges to prevent an unravelling thereof.

The need to seal cut edges of fabrics of the above-mentioned class has been well established, and various manual means have been employed for applying a heated sealing member to the cut edges to effect the required sealing operation. However, such methods are known to have produced unsatisfactory results in that portions of the edges have at times remained unsealed due to the fact that such sealing operations have had to be performed on edges already cut; and where sufficient precautions were taken to follow the cut edge with the sealing instrument, the operation was necessarily slow and costly. It is accordingly one of the major objectives of this invention to provide an apparatus which will obviate the above-mentioned shortcomings, an objective which my invention accomplishes through novel means which simultaneously cut and seal the web along a transverse line determined by guide means constituting part of the apparatus. The arrangement is hence such that the cutting and sealing operations are automatically performed by a single transverse movement of a component of my apparatus.

It is another object of my invention to provide adjustable means for measuring lengths of fabric to be cut so that the same apparatus is adapted to sever, from a web, sections of predetermined length.

It is also an object of my invention to provide an apparatus that will permit the feeding movement therealong of the web without interference by any of the components of the said apparatus.

A further object is to provide a relatively simple and readily fabricated apparatus having the aforesaid features and adapted to be operated by a person with no special mechanical skill.

Other objects, features and advantages will appear from the drawings and the description hereinafter given.

Referring to the drawings,

FIG. 1 is a fragmentary perspective view of the apparatus constituting a form of my invention, parts being broken away for clarity, a web of fabric being shown operatively in place by dot-dash lines, the carriage member being shown in full lines in an inoperative position and in dot-dash lines in an operative position.

FIG. 1A is a fragmentary section of FIG. 1 taken along lines 1A—1A.

FIG. 2 is a fragmentary plan view of FIG. 1, the motor and pulleys of the carriage being omitted.

FIG. 3 is an enlarged fragmentary section of FIG. 1 taken substantially along line 3—3.

FIG. 4 is a fragmentary section of FIG. 1 taken along line 4—4, the cutting and heat sealing member and the holding bar being shown in their respective retracted inoperative positions.

FIG. 5 is an enlarged fragmentary section of a portion of FIG. 4.

FIG. 6 is a view substantially like FIG. 5, but showing the cutting and heat sealing member and the holding bar in their respective operative positions.

FIG. 7 is a wiring diagram adapted for use with the apparatus of this invention.

In the particular embodiment of my invention illustrated, the base member 10 has an upper horizontal supporting surface 11 upon which rests the flat work supporting board 12 serving to support thereupon the web 13 extending from the rear portion of the apparatus forwardly to the front edge 14 of said board 12. The said web is made of fusible sheet material, and may be composed of acetate and rayon fibers of such thermoplastic properties that when heated they will become fused. Adjustably secured to the top of said board 12 is the flat bar 15 preferably containing the groove 16 extending along the length of said bar, said bar serving as an underlying supporting anvil for the fabric during the cutting and sealing operation to be hereinafter described. In the form shown, the opposite ends of said bar have the downwardly extending flanges 15a each carrying a set screw 15b in releasable frictioned engagement with the adjacent edge 12a of said board 12, whereby said bar 15 may be adjustably secured to said board. Extending upwardly from the said base 10 are the two spaced posts 17 and 18 at one side of the apparatus, there being correspondingly positioned posts 19 and 20 at the other side of the apparatus in transverse registry with said posts 17 and 18. Behind posts 17 and 18 is another post 21, and behind posts 19 and 20 is still another post 22. All said posts are in supporting engagement with the track member 23 extending transversley across and above the apparatus in the general region of the said anvil bar 15. Slidably mounted upon said track member 23 is the carriage 24, the latter having the downwardly extending front and rear portions 25 and 26, respectively, embracing the respective front and rear sides 27 and 28 of said track member 23. Said carriage has rotatably mounted thereupon a pair of rollers 29 on one side thereof, and another pair of rollers 30 on the other side, said rollers resting upon the front and rear upper surfaces 31 and 32 of said track member 23, whereby said carriage is adapted to rollably travel along said track member in a manner to be hereinafter described.

Mounted upon said carriage member 24 is the reversible brake motor 33 connected by conductors 34 and 35 to a suitable electrical circuit, such as is illustrated in FIG. 7. Operatively connected to the motor 33 is the pulley 36, the belt 37 connecting said pulley with pulley 38 affixed to shaft 39 rotatably supported by the bearing members 40 attached to the upper surface of the carriage 24. Said shaft 39 has mounted thereover the worm 41 in operative engagement with the gear 42, the latter being keyed to the vertical shaft 43 which carries therebelow the pinion 44 in operative engagement with the rack 45 on the inner wall 46 of the track member 23. The arrangement is such that upon the operative rotation of the motor 33 the pulleys 36 and 38, connected by belt 37, will cause the worm 41 to actuate the gear 42 and the pinion 44, whereupon the entire carriage member 24 will move along said track member 23 transversely with respect to the board member 12.

In the particular apparatus illustrated, there are two limit switches 47 and 48 suitably connected by conductors 49, 50, and 51, 52 to the circuit associated with the motor 33, said switches being adapted, in well known manner, to open the circuit when operatively actuated. The construction of said limit switches is not herein described, since it is well known to those skilled in the art, and a detailed description thereof is not necessary for an understanding of this invention. Suffice it to say for the purpose of this specification that each of these switches is spring-loaded and carries an arm 53 supporting a roller member 54 at its extremity, the outermost or projected position of the roller being the position at which the switch is closed, an operative retraction of the roller 54 and arm 53 causing an opening of the circuit through the motor. The carriage 24 has laterally opposite bevelled cam surfaces 55 and 56 connected by the rear cam surface 57. These cam surfaces are so positioned that when the carriage member is in one or the other of its extreme positions the adjacent coacting roller 54 will be moved to its retracted position to open the circuit. For example, when the carriage is on the left side of the apparatus, as shown in FIG. 2, the surface 57 is in engagement with the roller 54 of the switch 48 to maintain the roller in its retracted position, whereby the circuit is open; and when the carriage moves to the right side of the apparatus, the cam surface 56 will engage the roller 54 of the switch 47 to operatively retract it in the manner aforesaid and again open the circuit. However, when the carriage member is moving along its operative path between said limit switches 47 and 48, the cam surfaces 55, 56 and 57 are out of engagement with said rollers, whereby both of the rollers are in their projected positions and the motor circuit is accordingly closed. The arrangement is hence such that at the end of each complete operative movement of the carriage along the operative path of track member 23 the circuit will be opened, causing the motor 33 to stop and thereby causing a corresponding cessation of movement of the carriage member. This arrangement thus limits the operative travel of the carriage member to a single movement in one direction. To restart the carriage member in the opposite direction suitable switch means, such as the forward-reverse switch 33a, or other suitable switch means known to those skilled in the art, is manipulated to close the circuit and reactivate the motor and carriage member. In the particular circuit illustrated in FIG. 7, the respective limit switches 47 and 48 are shunted by normally open starting switches 47a and 48a, whereby upon a temporary closing of these starting switches the circuit is closed for moving the carriage out of engagement with the engaged roller.

Attached to the forward portion of the carriage 23 is the bracket 58 carrying the angle bar 59 and separated therefrom by the sheet of insulating material 60. The horizontal arm 61 of said angle bar contains apertures 62 through which extend the studs 63, the nuts 64 being in threaded engagement with said studs and in resting engagement upon said horizontal arm 61 of the angle bar. The said studs 63 extend downwardly and support the block 65, said block containing an internal cavity 66 supporting a heating member 67 with its heating element 68, the terminals of said element being electrically connected to the conductors 69 and 70. Attached to the bottom of the block 65 is the heated cutting member 71, the particular embodiment showing a set screw 72 disposed within the block 65 and in releasable holding engagement with said cutting member 71. The said cutting member edge has a circumferential cutting edge 73 disposed directly over and in registry with the said groove 16 of said anvil bar 15. Mounted over the portion of each stud 63 between the horizontal arm 61 of the angle bar 59 and the upper surface 74 of the block 65 is the helical spring 75, the latter adapted to exert a downward pressure upon the said block 65 and cutting member 71. The arrangement is such that by adjustably manipulating the nut 64, the studs 63 and the block 65 and cutting member 71 can be adjustably positioned for optimum setting with respect to the bar 15 and its said groove 16, to obtain suitable cutting and sealing efficacy, as will more clearly hereinafter appear.

Operatively disposed in a horizontal position between the said posts 17, 18 and 19, 20 is the holding bar 76, said bar, in the particular arrangement illustrated, being disposed to the rear of the anvil bar 15. Said bar is supported at its opposite ends by the springs 77, these being anchored to the underside of the track member 23, said springs normally maintaining the said holding bar 76 spaced above the work board 12. Connected to the opposite ends 78 of said bar 76 are the respective solenoid plungers 79, these being operatively associated, in known manner, with the respective solenoids 80. Said solenoids (schematically illustrated) contain the conductors 81 and 82 electrically connected, in known manner, to the circuit operating said motor 33, so that upon an operative actuation of said motor the said solenoids 80 will be actuated. Upon such operative actuation of the solenoids 80, the plungers 79 will be drawn downwardly, whereby the holding bar 76 will be moved, against the action of said springs 77, to its lowermost holding position against the upper surface of the board 12. Upon an operative opening of the motor circuit, the circuit through the said solenoids 80 will also be opened, whereupon the springs 77 will lift said holding bar 76 to its upper inoperative position.

In operatively employing this device, a web of the material 13 is placed upon the work board 12, the preferred method being to pull said web forwardly in the direction of arrow A from a roll (not shown) at the rear of the table. The forward edge 13a of the web is brought into alignment with the front edge 14 of the board 12, whereby the length of material to be operatively cut will be in accordance with the predetermined setting of the board 12. By shifting the board 12 either forwardly or rearwardly—and setting the bar 15 in vertical registry with the cutting edge 73 of the cutting member 71—the length of the severed section can be varied to suit requirements. When the board 12 and bar 15 are properly set, and the web 13 is in its proper operative position, the motor circuit is operatively closed, whereby the carriage 24 will move along the track member 23 and cause the cutting member 71 to engage the web of fabric 13. At the same time, as aforesaid, the solenoids 80 are actuated and the bar 76 operatively brought down to holding position in transverse engagement with said material, as shown in FIG. 5. It is preferred that the front end of the web be held down by the operator, whereby the web of material is held against movement by the operator and the said holding bar 76. The heating member 67 (connected to the circuit) transmits its heat to the block 65 and the cutting member 71, so that the cutting edge 73, while performing its operative cutting action by the yieldable pressure exerted by the springs 75 and the operative movement of the carriage, will also simultaneously seal the severed edge.

Upon the completion of one operative movement of the carriage, the predetermined length of fabric will have thus been cut and sealed along a straight path, in view of the transverse path of travel of the carriage and the coaction between the cutting edge 73 and the grooved portion 16 of the anvil bar 15. Since, as aforesaid, the holding bar 76 has become disengaged from the fabric upon the completion of the cutting action, the web at the rear of the bar 15 can be pulled forwardly until the front edge is in registry with the front edge of the board 12, in the manner aforesaid. Thereupon the circuit through the motor and associated components is operatively closed, whereupon another cutting and sealing cycle is performed.

It is thus evident that by the simple process of operatively activating the carriage member along its operative path, successive lengths of the web can be accurately cut into predetermined sizes and simultaneously sealed without the necessity of performing separate edge sealing operations. The accuracy of the severed edges is assured not only by virtue of the guided movement of the heated cutting edge, but also by the automatic action of the holding bar 76 during each cutting and sealing operation.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:

1. In an apparatus for cutting lengths of heat-fusible fabric and sealing the cut edges thereof, a base member, a flat work-supporting board supported by said base member, said board being movable longitudinally to selected operative positions with respect to said base member, an anvil disposed transversely along said board and positioned to receive thereover a web of said fabric operatively supported by said board, said anvil being adjustably movable to selected operative positions with respect to said board, a cutting member positioned at a level for operative engagement with the top of said anvil when the latter is in an operative position below the cutting member, heating means connected to said cutting member, a track member in fixed relation to said base member and disposed at a level above that of said anvil and extending in parallel relation thereto, a carriage supporting said cutting member and said heating means and movable along said track member, and means for moving said carriage along said track member, whereby said cutting member will operatively engage, cut and seal the portion of said fabric overlying said anvil along a line parallel to the path of travel of said carriage when the anvil is in its said operative position below said cutting member.

2. In an apparatus for cutting lengths of heat-fusible fabric and sealing the cut edges thereof, the combination according to claim 1, said anvil comprising a bar resting upon said board, and means releasably securing said bar to said board.

3. In an apparatus for cutting lengths of heat-fusible fabric and sealing the cut edges thereof, a flat work-supporting board, an anvil disposed transversely along said board and positioned to receive thereover a web of said fabric operatively supported by said board, a holding bar in spaced relation to said anvil and disposed transversely over said board and movable between an upper retracted position in spaced relation to said board and a lower operative position in pressing relation with said board, whereby when said holding bar is in its said operative position it will engage and hold against movement a portion of said operatively supported fabric, means to move said holding bar between its said operative and retracted positions, a cutting member above said anvil and positioned for operative engagement with the upper portion thereof, heating means connected to said cutting member, a track member disposed above and extending in parallel relation to said anvil, a carriage supporting said cutting member and said heating means and movable along said track member, and means for moving said carriage along said track member, whereby said cutting member will operatively engage, cut and seal the portion of said fabric overlying said anvil along a line parallel to the path of travel of said carriage.

4. In an apparatus for cutting lengths of heat-fusible fabric and sealing the cut edges thereof, the combination according to claim 3, said holding bar being disposed behind said anvil.

5. In an apparatus for cutting lengths of heat-fusible fabric and sealing the cut edges thereof, a flat work-supporting board, an anvil disposed transversely along said board and positioned to receive thereover a web of said fabric operatively supported by said board, a holding bar disposed transversely over said board and movable between an upper retracted position in spaced relation to said board and a lower operative position in pressing relation with said board, whereby when said holding bar is in its said operative position it will engage and hold against movement a portion of said operatively supported fabric, means to move said holding bar between its said operative and retracted positions, a cutting member above said anvil and positioned for operative engagement with the upper portion thereof, heating means connected to said cutting member, a track member disposed above and extending in parallel relation to said anvil, a carriage supporting said cutting member and said heating means and movable along said track member, means for moving said carriage along said track member, whereby said cutting member will operatively engage, cut and seal the portion of said fabric overlying said anvil along a line parallel to the path of travel of said carriage, and actuating means to simultaneously actuate said means for moving said carriage and said means for moving said holding bar to its operative position, whereby the operatively supported fabric will be held against movement when said cutting member is in operative engagement with the fabric.

6. In an apparatus for cutting lengths of heat-fusible fabric and sealing the cut edges thereof, a flat work-supporting board, an anvil disposed transversely along said board and positioned to receive thereover a web of said fabric operatively supported by said board, a holding bar disposed transversely over said board and movable between an upper retracted position in spaced relation to said board and a lower operative position in pressing relation with said board, whereby when said holding bar is in its said operative position it will engage and hold against movement a portion of said operatively supported fabric, electro-mechanical means operatively connected to said holding bar for moving it between its said operative and retracted positions, a cutting member above said anvil and positioned for operative engagement with the upper portion thereof, heating means connected to said cutting member, a track member disposed above and extending in parallel relation to said anvil, a carriage supporting said cutting member and said heating means and movable along said track member, electric motor driving means on said carriage for moving it along said track member, whereby said cutting member will operatively engage, cut and seal the portion of said fabric overlying said anvil along a line parallel to the path of travel of said carriage, an electrical circuit operatively connected to said motor and electro-mechanical means, and switch means in said circuit for simultaneously actuating said motor and electro-mechanical means, whereby the operatively supported fabric will be held against movement when said cutting member is in operative engagement with the fabric.

7. In an apparatus for cutting lengths of heat-fusible fabric and sealing the cut edges thereof, the combination according to claim 6, said electro-mechanical means comprising a solenoid connected to said circuit, a plunger operatively connected to said solenoid and said holding bar, and spring means normally supporting said holding bar in its said retracted position.

8. In an apparatus for cutting lengths of heat-fusible fabric and sealing the cut edges thereof, the combination according to claim 6, and two laterally opposite pairs of posts supporting said track member, the posts of each of said pairs being in spaced relation, the opposite terminals of said holding bar being disposed between the posts of said respective pairs.

9. In an apparatus for cutting lengths of heat-fusible fabric and sealing the cut edges thereof, a flat work-supporting board, an anvil disposed transversely along said board and positioned to receive thereover a web of said fabric operatively supported by said board, a cutting member above said anvil and positioned for operative engagement with the upper portion thereof, heating means connected to said cutting member, a track member disposed above said anvil and having a rack extending in parallel relation thereto, a carriage movable along said track member and having thereon an electric motor and geared means operatively connected to said motor and said rack, whereby upon an operative actuation of said motor said carriage will move along said track member, and supporting means on said carriage operatively supporting said cutting member and said heating means, whereby said cutting member will operatively engage, cut and seal the portion of said fabric overlying said anvil along a line parallel to the path of travel of said carriage, said track member having at opposite end portions thereof normally closed switch means operatively connected to said motor, said carriage having tripping means engageable with said respective switch means when the carriage is at said respective end portions of the track member for opening the engaged switch means, and means to close said switch means while said tripping means are operatively engaged therewith.

References Cited by the Examiner

UNITED STATES PATENTS

| | | | |
|---|---|---|---|
| 170,337 | 11/75 | Braidwood | 83—437 |
| 1,449,445 | 3/23 | Rand | 83—171 |
| 1,637,715 | 8/27 | Small et al. | 83—171 X |
| 2,007,225 | 7/35 | Strobel | 83—171 X |
| 2,551,811 | 5/51 | Mueller | 83—170 |
| 2,589,756 | 3/52 | Waters | 90—37 |

FOREIGN PATENTS

| | | |
|---|---|---|
| 509,979 | 10/30 | Germany. |
| 780,437 | 7/57 | Great Britain. |

RICHARD M. WOOD, *Primary Examiner.*